United States Patent
Lv et al.

(10) Patent No.: US 11,597,659 B2
(45) Date of Patent: Mar. 7, 2023

(54) DEVICE FOR TREATING HIGH-CONCENTRATION ORGANIC WASTEWATER BY CATALYTIC HYDROTHERMAL GASIFICATION

(71) Applicants: Nanjing University, Jiangsu (CN); Nanjing University-International Research Institute of Environmental Industries, Jiangsu (CN)

(72) Inventors: Lu Lv, Nanjing (CN); Linping Wang, Changzhou (CN); Jie Rui, Changzhou (CN); Qianlin Huang, Nanjing (CN); Jingsheng Xu, Changzhou (CN); Weiming Zhang, Nanjing (CN); Bingcai Pan, Nanjing (CN)

(73) Assignees: Nanjing University, Nanjing (CN); Nanjing University-International Research Institute of Environmental Industries, Changzhou (CN)

( * ) Notice: Subject to any disclaimer, the term of this patent is extended or adjusted under 35 U.S.C. 154(b) by 102 days.

(21) Appl. No.: 17/207,666

(22) Filed: Mar. 20, 2021

(65) Prior Publication Data
US 2021/0300787 A1 Sep. 30, 2021

(30) Foreign Application Priority Data
Mar. 31, 2020 (CN) .......................... 202010240714.5

(51) Int. Cl.
*C02F 1/02* (2023.01)
*C02F 1/72* (2023.01)
*C02F 101/30* (2006.01)

(52) U.S. Cl.
CPC .............. *C02F 1/025* (2013.01); *C02F 1/725* (2013.01); *C02F 2101/30* (2013.01); *C02F 2301/06* (2013.01)

(58) Field of Classification Search
CPC ............ C02F 1/001; C02F 1/008; C02F 1/02; C02F 1/12; C02F 1/16; C02F 1/325;
(Continued)

(56) References Cited

FOREIGN PATENT DOCUMENTS

| CN | 107601645 B | * | 10/2019 | .............. C02F 1/725 |
| CN | 110885162 A | * | 3/2020 | |
| CN | 113244738 A | * | 8/2021 | .............. B01D 53/04 |

OTHER PUBLICATIONS

Machine generated translation of CN-107601645-B (Year: 2019).*
Machine generated translation of CN-113244738-A (Year: 2021).*
Machine generated translation of CN-110885162-A (Year: 2020).*

* cited by examiner

*Primary Examiner* — Magali P Slawski
*Assistant Examiner* — Bernadette Karen McGann
(74) *Attorney, Agent, or Firm* — Dragon Sun Law Firm, PC; Jinggao Li; Nathaniel Perkins (57) ABSTRACT

Disclosed is a device for treating high-concentration organic wastewater by catalyst hydrothermal gasification, including a CHG reactor, a temporary wastewater storage tank and a condensing heat exchanger which are sequentially in loop connection. The CHG reactor includes a shell, a thermocouple, a water distribution device, and a packing support. The device of the present disclosure can quickly convert the high-concentration organic wastewater into clean energy or harmless gas at a low temperature under the action of a catalyst, so that the energy consumption of a treatment process is greatly reduced, and the treatment efficiency is improved. The device has potential application prospect.

7 Claims, 5 Drawing Sheets (58) Field of Classification Search
CPC .............. C02F 1/722; C02F 2209/001; C02F 2209/003; C02F 2209/005; C02F 2209/02; C02F 2209/06; C02F 2209/08; C02F 2209/40; C02F 2209/42; C02F 2103/001; C02F 2103/003; C02F 2103/18; C02F 2201/3227; C02F 2301/04; C02F 2301/08; C02F 2303/04; C02F 2303/10; C02F 2305/026; B01D 2253/10; B01D 53/005; B01D 2255/20707; B01D 2255/802; B01D 2257/308; B01D 2257/708; B01D 2256/245; B01D 2258/06; B01D 2259/804; B01D 2259/806; B01D 53/002; B01D 53/04; B01D 53/26; B01D 53/48; B01D 53/52; B01D 53/75; B01D 53/76; B01D 53/8612; B01D 53/8615; B01D 53/8668; B01D 53/8681; B01D 53/8684; B01D 53/8687

See application file for complete search history.

DEVICE FOR TREATING HIGH-CONCENTRATION ORGANIC WASTEWATER BY CATALYTIC HYDROTHERMAL GASIFICATION

CROSS-REFERENCE TO RELATED APPLICATION

This application claims priorities from the Chinese patent application 202010240714.5 filed Mar. 31, 2020, the content of which is incorporated herein in the entirety by reference.

TECHNICAL FIELD

The present disclosure relates to the technical field of wastewater treatment equipment, in particular to a device for treating high-concentration organic wastewater by catalytic hydrothermal gasification.

BACKGROUND

Industrial production has become an important part for driving economic development, but the "three wastes" generated in an industrial production process will also cause extremely serious environmental problems. Industrial organic wastewater, especially high-concentration organic wastewater that is difficult to biodegrade, has become a recognized problem in the environmental field. Especially in recent years, with the development of large-scale and integrated industrial production, the types and emissions of produced wastewater have been increasing, and the pollution to water bodies has become increasingly widespread and severe, which seriously threatens human health. Therefore, it is of great significance to develop novel high-concentration organic wastewater treatment technologies and corresponding treatment devices.

A catalytic hydrothermal gasification technology is a technology integrating a hydrothermal gasification technology and a catalytic oxidation technology. It uses the special nature of water in a high temperature and high pressure state and a catalyst to reduce the activation energy and the specific selectivity to fast and selectively decompose, at a low temperature, organic matters into gaseous clean energy or harmless gas. This technology which has the advantages of high efficiency, energy conservation, recyclability and the like, is advantageous in a high-concentration organic wastewater treatment process, and is gradually attracting the attention of scholars and entrepreneurs at home and abroad. However, there is no report on the device for treating the high-concentration organic wastewater by catalytic hydrothermal gasification technology. Therefore, in response to a market demand for treatment of high-concentration organic wastewater and the treatment advantages of the catalytic hydrothermal gasification technology, a novel device for treating high-concentration organic wastewater by catalytic hydrothermal gasification plays an important role of promoting recycling application of high-concentration organic wastewater resources.

SUMMARY

In order to solve the above-mentioned technical problems, the present disclosure provides a device for treating high-concentration organic wastewater by catalytic hydrothermal gasification.

The technical scheme of the present disclosure is that: A device for treating high-concentration organic wastewater by catalytic hydrothermal gasification includes: a CHG reactor for high-concentration organic wastewater reaction treatment, a temporary wastewater storage tank for temporarily storing heating feed liquid, and a condensing heat exchanger for heating the feed liquid. The CHG reactor includes: a shell, a thermocouple, a water distribution device and a packing support; a material inlet and a gas outlet are respectively formed in the shell; the packing support is used for placing a catalyst packing, and is arranged at the inner lower part of the shell; the water distribution device is arranged in the shell above the catalyst packing; the thermocouple is slantways inserted to a side wall of the shell, and extends into the catalyst packing; a liquid inlet of the temporary wastewater storage tank is connected to a condensed liquid outlet of the condensing heat exchanger by means of a high-pressure feeding pump and a pipeline; a liquid outlet of the temporary wastewater storage tank is connected to the material inlet by means of the high-pressure feed pump and the pipeline; and a condensed gas inlet of the condensing heat exchanger communicates with the gas outlet by means of a back pressure valve and a pipeline. The device adopts combined connection of the CHG reactor, the temporary wastewater storage tank and the condensing heat exchanger, and treats the high-concentration organic wastewater by the cooperation with the catalyst packing under the action of the water distribution device and the packing support, and the wastewater can be quickly transformed into clean energy or harmless gas at a lower temperature, which greatly reduces the energy consumption of the treatment process. This is a process of turning wastes into treasures.

Further, a check valve and a feed valve are also arranged on the pipeline between the temporary wastewater storage tank and the CHG reactor; and two groups of thermocouples are provided, which are respectively arranged at the upper parts and the lower parts of outer walls of two sides of the CHG reactor. The arrangement of the two groups of thermocouples may enhance monitoring of a temperature of the catalyst packing in the CHG reactor, but the quantity is not limited to this setting mode. Two groups of condensing heat exchangers are provided, which are connected in series. Pipelines among the CHG reactor, the condensing heat exchanger and the temporary wastewater storage tank all adopt tubular products having a thermal insulation function. By means of the selection of the thermal insulation tubular products, the heat loss can be reduced, thereby improving recycling of heat in the system of this device.

As one technical scheme of the packing support of the present disclosure, the packing support is specifically a glass fiber-reinforced plastic packing support; the water distribution device is specifically an annular water distribution pipeline; and two rows of water distribution holes are formed in the annular water distribution pipeline, and all the water distribution holes are in crossed arrangement. Each water distribution hole has an aperture of 6 to 10 mm, and a clearance between the water distribution holes is 100 to 150 mm By means of a ringlike design, the annular water distribution pipeline can ensure that a water pressure is uniform and stabilized; and meanwhile, the two rows of water distribution holes are disposed, the aperture of which is 6 to 10 mm and the hole clearance of which is 100 to 150 mm, and the water distribution holes are in crossed arrangement, so that the high-concentration organic wastewater stably and uniformly drips to a surface of the catalyst packing.

As another technical scheme of the packing support of the present disclosure, the packing support is specifically a circulating packing support. The circulating packing support includes: a packing net plate for placing the catalyst packing, a packing conveying column for upwards conveying the catalyst packing, and a packing guide pipe for downwards conveying the catalyst packing.

A plurality of groups of packing net plates are arranged in the shell at equal intervals, and are specifically divided into: a top-layer packing net plate having a conical section, an intermediate-layer packing net plate having an inverted conical screen, and a bottom-layer packing net plate having an inverted conical section, and circumferential outer edges of all the groups of packing net plates are detachably connected to an inner wall of the shell. The center of each of the top-layer packing net plate and the intermediate-layer packing net plate is provided with a through hole sleeved on the packing conveying column. Annular clamping slots used for being matched and abutted with clamping rings nested on the packing conveying column are arranged at the through holes. The center of the bottom-layer packing net plate is provided with one embedding slot for abutting to enable the packing conveying column to be in limited rotation.

The packing conveying column includes an internally hollow column body and a center rotating rod arranged at the axis in the column body; a plurality of material holes are circumferentially formed in the side wall of the upper part at positions, corresponding to all the packing net plates, of the column body. An upper top surface of the column body is also provided with a rotating block which is connected to a transmission component for transmission. The rotating block is fixedly connected to the upper end of the center rotating rod, and the center rotating rod is also provided with a helical blade used for lifting the catalyst packing.

Branch ports detachably connected to all material guide connection ports are formed in the packing guide pipe; all the material guide connection ports are sequentially arranged on the outer wall of the shell at the upper part corresponding to the positions of the corresponding packing net plates; and the upper top surface and the lower bottom surface of the packing guide pipe are correspondingly provided with a charging hole and a material outlet which are provided with sealing doors.

By means of the above-mentioned structural design of the circulating packing support, the plurality of groups of packing net plates are used to separate the catalyst packing on different layers, and at the same time, the function of the packing conveying column for driving the conveying from bottom to top may be used to enable the catalyst packing in the CHG reactor to do circulating motion, by cooperation with the function of the packing guide pipe, from the bottom-layer packing net plate to the top-layer packing net plate, thereby increasing the utilization rate of the catalyst packing on each packing net plate and enhancing the use effect of the catalyst packing to further improve the treatment efficiency and effect of the high-concentration organic wastewater under the action of the catalyst packing.

Further, a thermowell hole used for allowing the thermocouple to be inserted and pass through is also arranged on the intermediate-layer packing net plate, and a plurality of mesh baffles are arranged on the helical blade of the packing conveying column at equal intervals. By means of the arrangement of the mesh baffles on the helical blade, the action effect of the packing conveying column can be further enhanced, and the conveying efficiency of the structure is further improved.

According to one technical scheme of the transmission component of the present disclosure, the transmission component is a driving motor, and the driving motor is arranged on the upper top surface of the shell of the CHG reactor, and is connected to the rotating block for transmission by means of an output shaft of the driving motor. By means of the arrangement of the driving motor, kinetic energy driving can be effectively provided to the circulating packing support, but the energy consumption would be higher.

According to another technical scheme of the transmission component of the present disclosure, the transmission component is composed of a water distribution device and a rotating rod. The water distribution device includes an internally hollow water distribution disk; and the water distribution disk is composed of a center disk structure and a water distribution ring structure located at a circumferential outer edge of the center disk structure.

The rotating rod is arranged at the center of the lower bottom surface of the center disk structure and is connected to the rotating block, and a rotating wheel is arranged in the water distribution disk and is connected to the rotating rod; a plurality of rotating vanes matched with the size of a circular section of the water distribution ring structure are circumferentially arranged at the circumference of the rotating wheel; and retaining rings used for retaining and limiting flow are arranged on the rotating wheel behind the rotating vanes.

Staggered water outlet holes are formed in the lower bottom surface of the water distribution ring structure; a plurality of groups of several water outlet rotating heads are annularly distributed on the lower bottom surface of the center disk structure; the water outlet rotating heads include rotating pipes connected to the lower bottom surface of the center disk structure by means of shaft sleeves; the upper ends of the rotating pipes are provided with rotating gears; the lower ends of the rotating pipes are provided with water outlet heads; one transmission toothed ring is arranged at a position, corresponding to the position of the water outlet rotating head of each circle, on the rotating wheel and is in meshing transmission with the rotating gear of each water outlet rotating head.

By means of the structural design of the water distribution disk, the plurality of groups of water outlet rotating heads are arranged on the basis of the annular water distribution pipeline to further improve the uniformity of water distribution, so that the high-concentration organic wastewater is more stably and uniformly sprayed to the surface of the catalyst packing; at the same time, by means of the arrangement of the structures such as the rotating wheel, the kinetic energy of pumped water flow of the high-pressure feed pump can be effectively used, and is converted into a driving force for driving the circulating packing support and the water outlet rotating heads to rotate. Compared with the driving motor, this is lower in energy consumption, and the energy consumption of the treatment process is greatly reduced.

The present disclosure has the beneficial effects that:

(1) According to the high-concentration organic wastewater device of the present disclosure, the high-concentration organic wastewater can be quickly converted into clean energy or harmless gas at a lower temperature under the action of the catalyst packing, so that the energy consumption of the treatment process is greatly reduced, and the treatment of the high-concentration organic wastewater is more energy efficient and environmentally friendly.

(2) The water distribution device of the present disclosure adopts a ringlike water distribution mode, and the ringlike design can ensure that a water pressure is uniform and stabilized; at the same time, the two rows of water distribution holes are in crossed arrangement, so that the high-concentration organic wastewater is stably and uniformly drips to the surface of the packing.

(3) The inner packing in the reactor of the present disclosure is composed of the thermowell and the catalyst packing; and the modularized overall installation is favorable for installation and overhaul of the reactor.

(4) The present disclosure uses, by means of two stages of heat exchangers, heat carried by gas generated by the reactor to heat raw water of the high-concentration organic wastewater, thereby recycling part of the heat and lowering the safety risk caused by overheat of the gas.

(5) The circulating packing support designed by the present disclosure, the plurality of groups of packing net plates are used to separate the catalyst packing on different layers, and at the same time, the function of the packing conveying column for driving the conveying from bottom to top may be used to enable the catalyst packing in the CHG reactor to do circulating motion from the lower layer to the upper layer, thereby increasing the utilization rate of each deep catalyst packing and enhancing the use effect of the catalyst packing to further improve the treatment efficiency and effect of the high-concentration organic wastewater under the action of the catalyst.

(6) The water distribution disk further improves the uniformity of water distribution, so that the high-concentration organic wastewater is more stably and uniformly sprayed to the surface of the catalyst packing; at the same time, by means of the arrangement of the structures such as the rotating wheel, the kinetic energy of the water flow is effectively converted into a driving force for driving the circulating packing support and the water outlet rotating heads to rotate. Compared with the driving motor, this is lower in energy consumption, greatly reduces the energy consumption of the treatment process, and is more energy efficient and environmentally friendly.

In the drawings: 1: CHG reactor; 11: shell; 12: thermocouple; 13: material inlet; 14: gas outlet; 15: material guide connection port; 2: temporary wastewater storage tank; 21: liquid inlet; 22: liquid outlet; 3: condensing heat exchanger; 31: condensed liquid outlet; 32: condensed gas inlet; 4: annular water distribution pipeline; 41: water distribution hole; 5: glass fiber-reinforced plastic packing support; 6: circulating packing support; 61: packing net plate; 611: top-layer packing net plate; 612: intermediate-layer packing net plate; 613: bottom-layer packing net plate; 614: through hole; 615: annular clamping slot; 616: embedding slot; 617: thermowell hole; 62: packing conveying column; 621: column body; 622: center rotating rod; 623: material hole; 624: helical blade; 625: mesh baffle; 63: packing guide pipe; 631: branch port; 632: charging hole; 633: material outlet; 64: clamping ring; 65: rotating block; 7: transmission component; 71: driving motor; 72: water distribution disk; 721: center disk structure; 722: water distribution ring structure; 73: rotating rod; 74: rotating wheel; 741: rotating vane; 742: retaining ring; 743: transmission toothed ring; 75: water outlet hole; 76: water outlet rotating head; 761: rotating pipe; 762: rotating gear; and 763: water outlet head.

DESCRIPTION OF THE EMBODIMENTS

Embodiment 1

Figure 1:
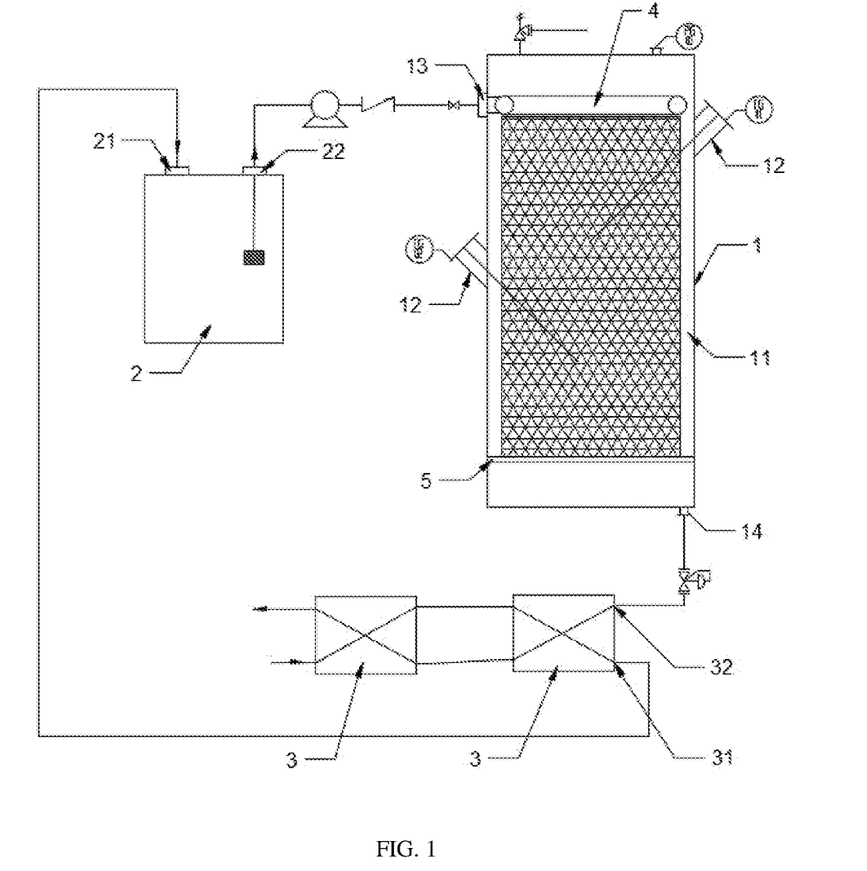
FIG. 1 is an overall schematic structural diagram of a device of the present disclosure.

As shown in FIG. 1, a device for treating high-concentration organic wastewater by catalytic hydrothermal gasification includes: a CHG reactor 1 for high-concentration organic wastewater reaction treatment, a temporary wastewater storage tank 2 for temporarily storing heating feed liquid, and a condensing heat exchanger 3 for heating the feed liquid.

As shown in FIG. 1, the CHG reactor 1 for the treatment of the high-concentration organic wastewater reaction includes: a shell 11, a thermocouple 12, a water distribution device and a packing support. A material inlet 13 is formed in the upper part of the left upper side of the shell 11; the gas outlet 14 is formed in the right part of the lower bottom of the shell 11; the packing support is used for placing a catalyst packing, and is arranged at the inner lower part of the shell 11; the water distribution device is arranged in the shell 11 above the catalyst packing; and the thermocouple 12 is slantways inserted to a side wall of the shell 11, and extends into the catalyst packing. There are two groups of thermocouples 12, which are respectively arranged at the upper parts and the lower parts of outer walls of two sides of the CHG reactor 1. The thermocouple 12 adopts a commercially available thermocouple 12, the appearance of which is adjusted to adapt to the requirements of the installation specification of this device. Furthermore, the arrangement of the two groups of thermocouples may enhance monitoring of a temperature of the catalyst packing in the CHG reactor 1.

Figure 2:
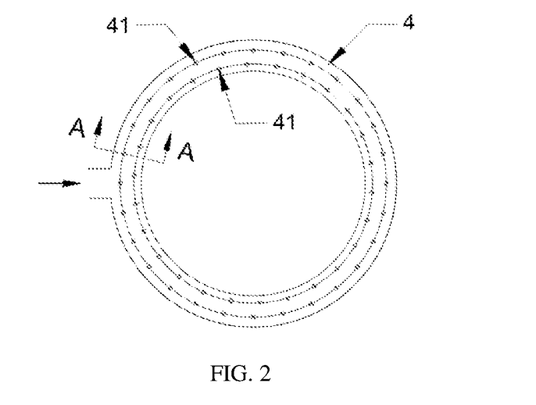
FIG. 2 is a top structural view of a water distribution device of Embodiment 1 of the present disclosure.
Figure 3:
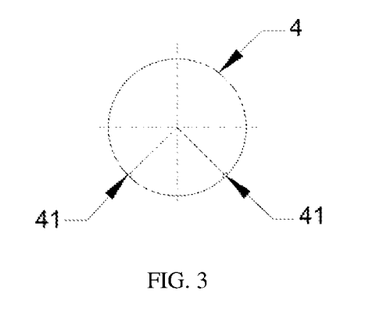
FIG. 3 is a sectional view of a position A-A of FIG. 2 of the present disclosure.

The packing support is specifically a glass fiber-reinforced plastic packing support 5, the model of which is Jiangsu Fuxing 38 # split type glass fiber-reinforced plastic packing support. As shown in FIG. 2 and FIG. 3, the water distribution device is specifically an annular water distribution pipeline 4; and two rows of water distribution holes 41 are formed in the annular water distribution pipeline 4, and all the water distribution holes 41 are in crossed arrangement. Each water distribution hole 41 has an aperture of 8 mm, and a clearance between the water distribution holes 41 is 120 mm By means of a ringlike design, the annular water distribution pipeline 4 can ensure that a water pressure is uniform and stabilized; and meanwhile, the two rows of water distribution holes 41 are disposed, the aperture of which is 8 mm and the hole clearance of which is 120 mm, and the water distribution holes 41 are in crossed arrangement, so that the high-concentration organic wastewater stably and uniformly drips to a surface of the catalyst packing.

Parameters of the catalyst packing are as follows: 1) Model: the HT series; 2) constituents: 57.1% of NiO, 41.2% of $Al_2O_3$, 0.9448% of $SiO_2$, 0.439% of ZnO, 0.188% of CuO, 0.0655% of $Fe_2O_3$, and 0.0627% of CaO; 3) physicochemical parameters: a specific surface area that is 300 $m^2/g$, a pore volume that is 0.7 $cm^3/g$, and a radial average compressive strength that is greater than or equal to 200 N/cm.

As shown in FIG. 1, in the temporary wastewater storage tank 2 for temporarily storing the heating feed liquid, a liquid inlet 21 of the temporary wastewater storage tank 2 is connected to a condensed liquid outlet 31 of the condensing heat exchanger 3; a liquid outlet 22 of the temporary wastewater storage tank 2 is connected to a material inlet 13 by means of a high-pressure feed pump and a pipeline; and a check valve and a feed valve are also arranged on the pipeline between the temporary wastewater storage tank 2 and the CHG reactor 1.

As shown in FIG. 1, for the condensing heat exchanger 3 for heating the feed liquid, there are two groups of condensing heat exchangers 3, which are connected in series. Condensed gas inlets 32 of the condensing heat exchangers 3 communicate with the gas outlet 14 by means of a back pressure valve and a pipeline. Pipelines among the CHG reactor 1, the condensing heat exchangers 3 and the temporary wastewater storage tank 2 all adopt tubular products having a thermal insulation function, and specifically are tubular products having a thermal insulation function, such as a commercially available polyurethane thermal insulation pipe. By means of the selection of the thermal insulation tubular product, the heat loss can be reduced, thereby improving recycling of heat in the system of this device.

The above-mentioned device adopts combined connection of the CHG reactor 1, the temporary wastewater storage tank 2 and the condensing heat exchangers 3, and treats the high-concentration organic wastewater by the cooperation with the catalyst packing under the action of the water distribution device and the packing support, and the wastewater can be quickly transformed into clean energy or harmless gas at a lower temperature, which greatly reduces the energy consumption of the treatment process. This is a process of turning wastes into treasures.

A working principle of the above-mentioned device is as follows:

The high-concentration organic wastewater enters the CHG reactor 1 by means of a filter and the high-pressure feed pump; the organic wastewater is uniformly distributed on the catalyst packing layer by means of the water distribution device; organic matters are decomposed under the action of the catalyst; the decomposed products and water vapor pass through the back pressure valve and the two stages of condensing heat exchangers 3, and then are burnt or stored; condensed water is recycled or directly discharged; a cooling material for the two stages of condensing heat exchangers 3 is feed liquid; the feed liquid is heated in a gas-liquid exchange process, and the heat energy is recycled; and the heated liquid feed enters the temporary wastewater storage tank 2.

Embodiment 2

The present embodiment is basically the same as Embodiment 1, except that apertures and clearances of the water distribution device are different. Specifically: Two rows of water distribution holes 41 are formed in the annular water distribution pipeline 4, and all the water distribution holes 41 are in crossed arrangement. Each water distribution hole 41 has an aperture of 6 mm, and a clearance between the water distribution holes 41 is 100 mm.

Embodiment 3

The present embodiment is basically the same as Embodiment 1, except that apertures and clearances of the water distribution device are different. Specifically: Two rows of water distribution holes 41 are formed in the annular water distribution pipeline 4, and all the water distribution holes 41 are in crossed arrangement. Each water distribution hole 41 has an aperture of 10 mm, and a clearance between the water distribution holes 41 is 150 mm.

Embodiment 4

The present embodiment is basically the same as Embodiment 1, except that the parameters of the catalyst packing are different. Specifically: Parameters of the catalyst packing are as follows: 1) Model: the HT series; 2) constituents: 49.68% of NiO, 50% of $Al_2O_3$, 0.1% of $SiO_2$, 0.1% of ZnO, 0.1% of CuO, 0.01% of $Fe_2O_3$, and 0.01% of CaO; 3) physicochemical parameters: a specific surface area that is 100 $m^2/g$, a pore volume that is 0.2 $cm^3/g$, and a radial average compressive strength that is greater than or equal to 200 N/cm.

Embodiment 5

The present embodiment is basically the same as Embodiment 1, except that the parameters of the catalyst packing are different. Specifically: Parameters of the catalyst packing are as follows: 1) Model: the HT series; 2) constituents: 60% of NiO, 36.3% of $Al_2O_3$, 2% of $SiO_2$, 1% of ZnO, 0.5% of CuO, 0.1% of $Fe_2O_3$, and 0.1% of CaO; 3) physicochemical parameters: a specific surface area that is 500 $m^2/g$, a pore volume that is 1 $cm^3/g$, and a radial average compressive strength that is greater than or equal to 200 N/cm.

Embodiment 6

Figure 4:
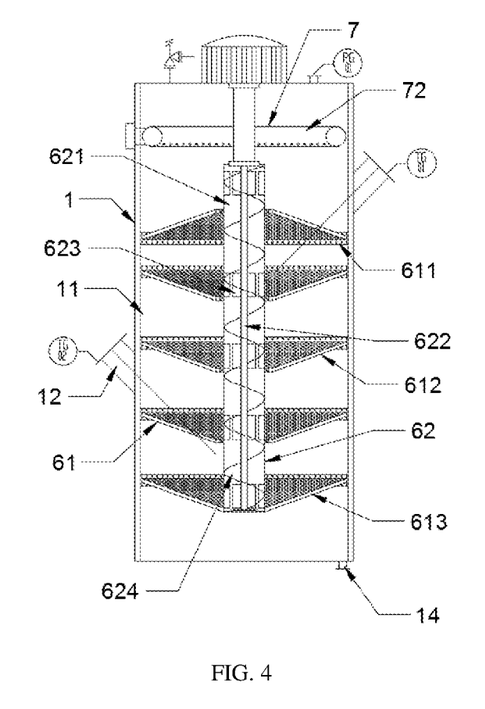
FIG. 4 is a schematic structural diagram of a CHG reactor of Embodiment 2 of the present disclosure.
Figure 5:
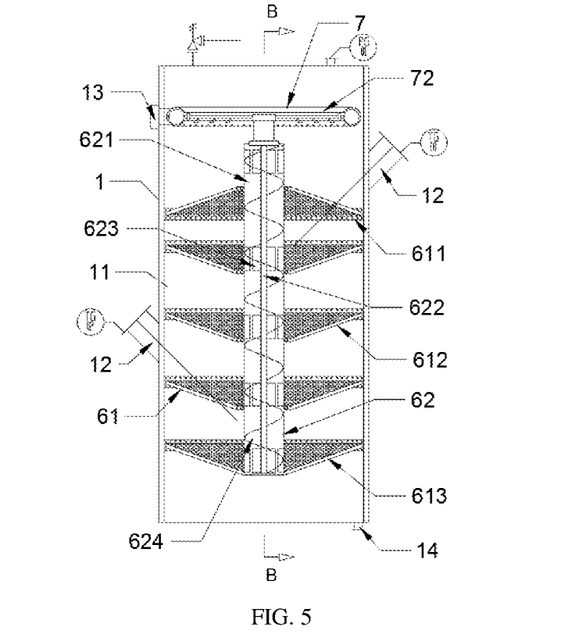
FIG. 5 is a schematic structural diagram of a CHG reactor of Embodiment 3 of the present disclosure.
Figure 6:
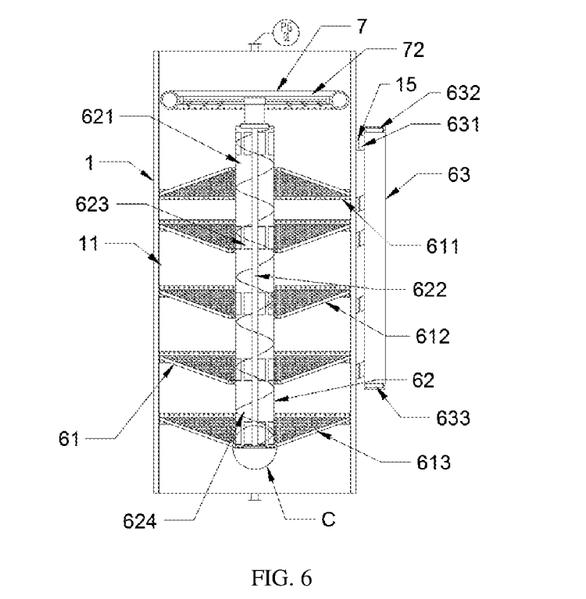
FIG. 6 is a sectional view of a position B-B of FIG. 5 of the present disclosure.
Figures 7, 8:
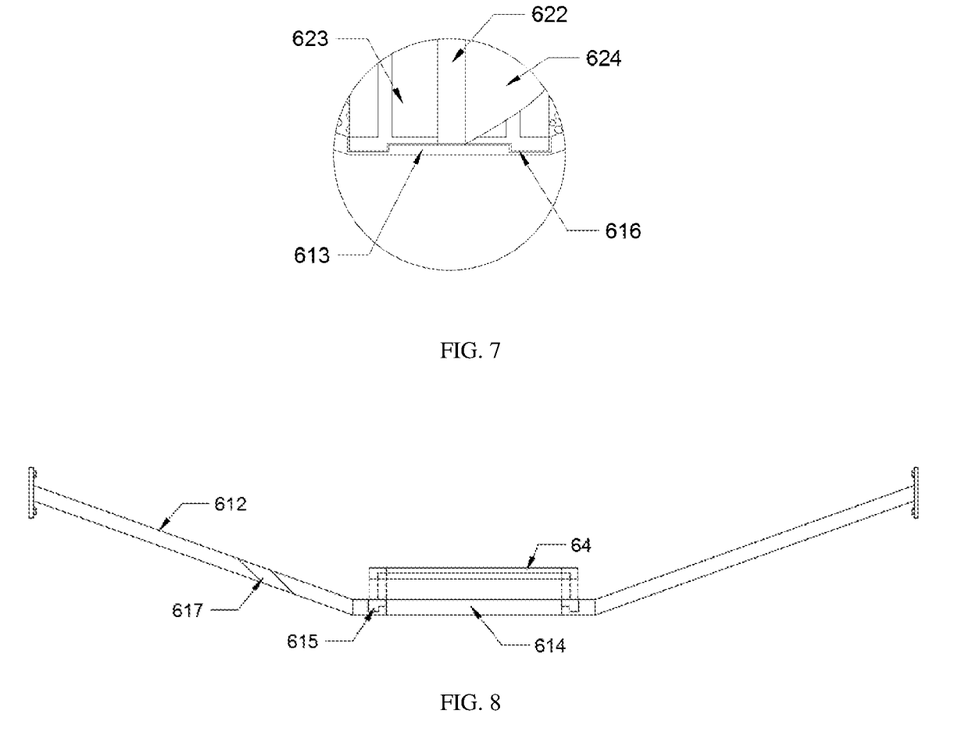
FIG. 7 is a sectional view of a position C-C of FIG. 6 of the present disclosure.
FIG. 8 is a schematic structural diagram of an intermediate-layer packing net plate of the present disclosure.
Figure 9:
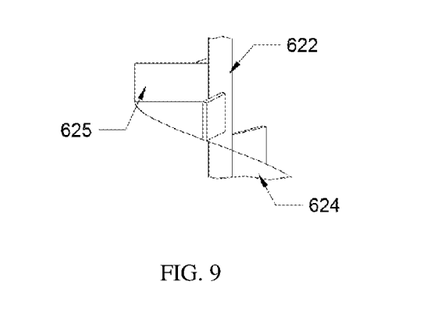
FIG. 9 is a partially schematic structural diagram of a helical blade of the present disclosure.

The present embodiment is basically the same as Embodiment 1, except that the packing support is different. The packing support is specifically a circulating packing support 6. As shown in FIG. 4, FIG. 6 and FIG. 7, the circulating packing support 6 includes:

a plurality of groups of packing net plates 61 for placing the catalyst packing, which are arranged in the shell 11 at equal intervals and are respectively divided into: one group of top-layer packing net plate 611 having a conical section, three groups of intermediate-layer packing net plates 612 having inverted conical sections, and one group of bottom-layer packing net plate 613 having an inverted conical sections; circumferential outer edges of all the groups of packing net plates 61 are detachably connected to the inner wall of the shell 11;

as shown in FIG. 4, FIG. 8 and FIG. 9, the center of each of the top-layer packing net plate 611 and the intermediate-layer packing net plates 612 is provided with a through hole 614 sleeved on a packing conveying column 62; annular clamping slots 615 used for being matched and abutted with clamping rings 64 nested on the packing conveying column 62 are arranged at the through holes 614; the center of the bottom-layer packing net plate 613 is provided with one embedding slot 616 for abutting to enable the packing conveying column 62 to be in limited rotation; thermowell holes 617 used for allowing the thermocouples 12 to be inserted and pass through are also arranged on the intermediate-layer packing net plates 612, and a plurality of mesh baffles 625 are arranged on a helical blade 624 of the packing conveying column 62 at equal intervals; by means of the arrangement of the mesh baffles 625 on the helical blade 624, the action effect of the packing conveying column 62 can be further enhanced, and the conveying efficiency of the structure is further improved;

the packing conveying column 62 for upwards conveying the catalyst packing; the packing conveying column includes an internally hollow column body 621 and a center rotating rod 622 arranged at the axis in the column body 621; 4 material holes 623 are circumferentially formed in the side wall of the upper part at positions, corresponding to all the packing net plates 61, of the column body 621; an upper top surface of the column body 621 is also provided with a rotating block 65 which is connected to a transmission component 7 for transmission; the rotating block 65 is fixedly connected to the upper end of the center rotating rod 622, and the center rotating rod 622 is also provided with a helical blade 624 used for lifting the catalyst packing; the transmission component 7 is a driving motor 71; the driving motor 71 is a commercially available rotating motor, the appearance of which is adjusted to adapt to the requirements of the installation specification of this device; the driving motor 71 is arranged on the upper top surface of the shell 11 of the CHG reactor 1, and is connected to the rotating block 65 for transmission by means of an output shaft of the driving motor 71; by means of the arrangement of the driving motor 71, kinetic energy driving can be effectively provided to the circulating packing support 6, but the energy consumption would be higher;

a packing guide pipe 63 for downwards conveying the catalyst packing; branch ports 631 detachably connected to all material guide connection ports 15 are formed in the packing guide pipe; all the material guide connection ports 15 are sequentially arranged on the outer wall of the shell 11 at the upper part corresponding to the positions of the corresponding packing net plates 61; and the upper top surface and the lower bottom surface of the packing guide pipe 63 are correspondingly provided with a charging hole 632 and a material outlet 633 which are provided with sealing doors.

By means of the above-mentioned structural design of the circulating packing support 6, the plurality of groups of packing net plates 61 are used to separate the catalyst packing on different layers, and at the same time, the function of the packing conveying column 62 for driving the conveying from bottom to top may be used to enable the catalyst packing in the CHG reactor 1 to do circulating motion, by cooperation with the function of the packing guide pipe 63, from the bottom-layer packing net plate 613 to the top-layer packing net plate 611, thereby increasing the utilization rate of the catalyst packing on each packing net plate 61 and enhancing the use effect of the catalyst packing to further improve the treatment efficiency and effect of the high-concentration organic wastewater under the action of the catalyst packing.

A working method of the above-mentioned circulating packing support 6 is that: When the rotating block 65 is driven by the transmission component 7 to drive the center rotating rod 622 to rotate, the helical blade 624 rotates to drive the catalyst packings of the bottom-layer packing net plate 613 and the intermediate-layer packing net plates 612 to move upwards to the top-layer packing net plate 611; after the packing exceeds the material guide connection ports 15 above the top-layer packing net plate 611, the packing enters the packing guide pipe 63 along the branch ports 631 and falls down onto all the intermediate-layer packing net plates 612 and the bottom-layer packing net plate 613, and then is gathered to the material holes 623 with the gradients of the packing net plates 61, repeatedly, to realize up-down adjustment and turning of the catalyst packing.

When it is necessary to supplement the catalyst packing, the catalyst packing is added only by means of the charging hole 632 at the upper end of the packing guide pipe 63. Under the action of the circulating packing support 6, the catalyst packing can be brought into the CHG reactor 1. When it is necessary to replace the catalyst packing, the sealing door of the material outlet 633 at the lower end of the packing guide pipe 63 is opened at first; most of the used catalyst packing is discharged by means of the action of the circulating packing support 6, and the material outlet 633 is then closed; and subsequently, a new catalyst packing is supplemented by a method that is the same as the above-mentioned operation method for supplementing the catalyst packing.

A working method of the above-mentioned transmission component 7 is that: The driving motor 71 is initiated by means of controlling a switch to be connected to the mains supply, and the rotating block 65 is driven by the output shaft of the driving motor to rotate to drive the circulating packing support 6.

Embodiment 7

The present embodiment is basically the same as Embodiment 1, except that the mode and the structure of the transmission component 7 are different. As shown in FIG. 5, FIG. 6 and FIGS. 10 to 12, the transmission component 7 is composed of a water distribution device and a rotating rod 73. The water distribution device includes an internally hollow water distribution disk 72; and the water distribution disk 72 is composed of a center disk structure 721 and a water distribution ring structure 722 located at a circumferential outer edge of the center disk structure 721. The rotating rod 73 is arranged at the center of the lower bottom surface of the center disk structure 721 and is connected to the rotating block 65, and a rotating wheel 74 is arranged in the water distribution disk 72 and is connected to the rotating rod 73; 18 rotating vanes 741 matched with the size of a circular section of the water distribution ring structure 722 are circumferentially arranged at the circumference of the rotating wheel 74; and retaining rings 742 used for retaining and limiting flow are arranged on the rotating wheel 74 behind the rotating vanes 741. Staggered water outlet holes 75 are formed in the lower bottom surface of the water distribution ring structure 722; 3 groups of several water outlet rotating heads 76 are annularly distributed on the lower bottom surface of the center disk structure 721; the water outlet rotating heads 76 include rotating pipes 761 connected to the lower bottom surface of the center disk structure 721 by means of shaft sleeves; the upper ends of the rotating pipes 761 are provided with rotating gears 762; the lower ends of the rotating pipes 761 are provided with water outlet heads 763; one transmission toothed ring 743 is arranged at a position, corresponding to the position of the water outlet rotating head 76 of each circle, on the rotating wheel 74 and is in meshing transmission with the rotating gear 762 of each water outlet rotating head 76.

Figure 10:
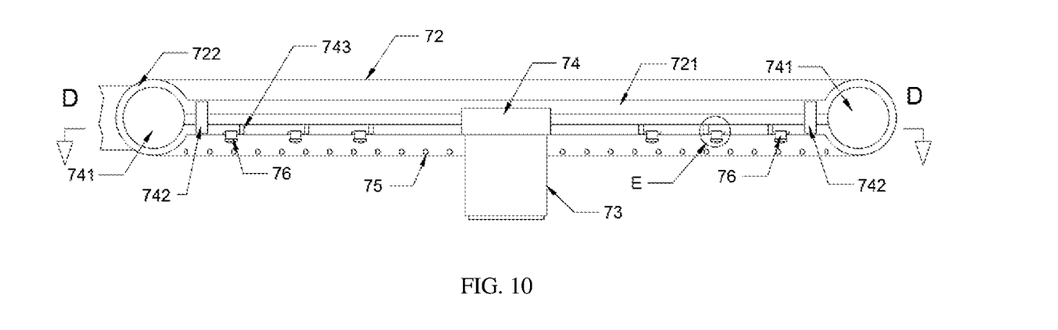
FIG. 10 is an overall schematic structural diagram of a water distribution disk of the present disclosure.
Figure 11:
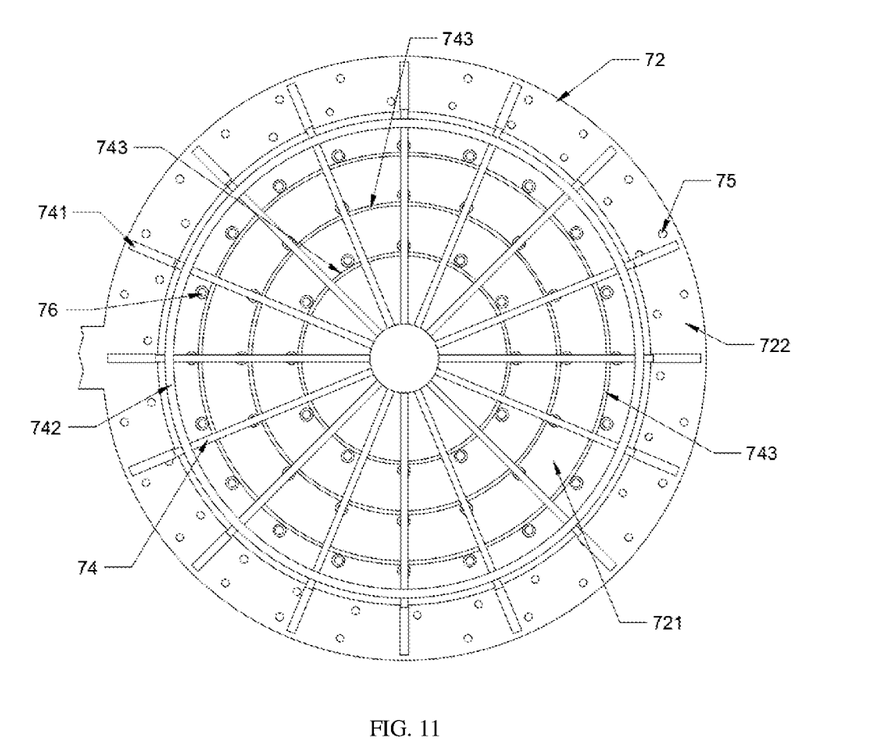
FIG. 11 is a sectional view of a position D-D of FIG. 10 of the present disclosure.
Figure 12:
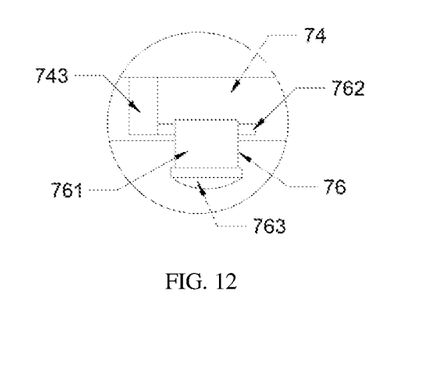
FIG. 12 is an enlarged diagram of a structure at a position E of FIG. 10 of the present disclosure.

By means of the structural design of the water distribution disk 72, the plurality of groups of water outlet rotating heads 76 are arranged on the basis of the annular water distribution pipeline 4 to further improve the uniformity of water distribution, so that the high-concentration organic wastewater is more stably and uniformly sprayed to the surface of the catalyst packing; at the same time, by means of the arrangement of the structures such as the rotating wheel 74, the kinetic energy of pumped water flow of the high-pressure feed pump can be effectively used, and is converted into a driving force for driving the circulating packing support 6 and the water outlet rotating heads 76 to rotate. Compared with the driving motor 71, this is lower in energy consumption, and the energy consumption of the treatment process is greatly reduced.

A working method of the transmission device 7 is that: After the high-concentration organic wastewater which is pumped by the high-pressure feed pump flows into the water inlet of the water distribution disk 72, the water flow of the high-concentration organic wastewater is mainly retained by the retaining rings 742 and then flows along the water distribution ring structure 722; the kinetic energy of the water flow pushes all the rotating vanes 741 to drive the rotating wheel 74 to rotate, so the rotating rod 73 drives the rotating block 65 to rotate to drive the circulating packing support 6; during rotation, the rotating wheel 74 drives all the transmission toothed rings 743 to rotate, and then the rotating gear 762 is in meshing transmission with the transmission toothed rings 743 to drive all the water outlet rotating heads 76 to rotate, thereby rotatably discharging water by means of small holes arranged in the circumferential directions of the water outlet heads 763.

High-Concentration Organic Wastewater Treatment Test

High-concentration organic wastewater having the COD content of 20000 to 100000 mg/L is treated to produce $CH_4$, $H_2$, $CO_2$ and the like, thereby achieving the objective of reducing the COD content.

I. Test Sample

High-concentration organic wastewater discharged by a certain factory in this city was selected as experimental sample wastewater, and its COD content was measured to be about 85000 mg/L; 50 t of the experimental sample wastewater was selected, uniformly stirred, and equally divided into 8 groups of test samples used as test samples for all embodiments and comparative examples.

II. Test Items and Conclusions

Embodiments 1 to 7 and a traditional combustion method were respectively used to treat the high-concentration organic wastewater, and each COD removal rate was calculated, specifically as follows:

1) Exploration of Effects of Catalytic Hydrothermal Gasification Treatment and Treatment of the Traditional Combustion Method The test sample wastewater of the same tunnage was removed respectively by means of Embodiment 1 and the comparative example (the traditional combustion method). The COD removal rate of the wastewater was calculated, and the energy consumption for wastewater treatment was roughly estimated, specifically as shown in Table 1 below:

TABLE 1

COD removal rates and energy consumption levels of Embodiment 1 and the comparative example

| Group | COD removed amount (mg/L) | COD removal rate (%) | Energy consumption level |
|---|---|---|---|
| Embodiment 1 | 79875 | 93.97 | Level I |
| Comparative example | 75905 | 89.30 | Level V |

Note:

The energy consumption level includes, from low to high, Level I, Level II, Level III, Level IV, and Level V. The energy consumption of Embodiment 1 is used as the lowest level (Level I), and the energy consumption of the comparative example is used as the highest level (Level V). The level range is equally divided into Level I, Level II, Level III, Level IV, and Level V.

Conclusion: It can be known from the data of Table 1 that different treatment methods are adopted; since the energy consumption of the combustion method of the comparative example is greatly different from the energy consumption of Embodiment 1, and the COD removal rate of the combustion method is lower than that of Embodiment 1, Embodiment 1 has a better comprehensive treatment effect on the wastewater.

2) Exploration of the Influence of Water Distribution Hole Setting Parameters of the Annular Water Distribution Pipeline on the COD Removal Rate The test sample wastewater of the same tunnage was removed respectively by means of Embodiment 1, Embodiment 2 and Embodiment 3, and the COD removal rate of the wastewater was calculated, specifically as shown in Table 2 below:

TABLE 2

COD removal rates of Embodiments 1-3

| Group | COD removed amount (mg/L) | COD removal rate (%) |
|---|---|---|
| Embodiment 1 | 79875 | 93.97 |
| Embodiment 2 | 78940 | 92.87 |
| Embodiment 3 | 78485 | 92.34 |

Conclusion: It can be seen from the data of Table 2 that different water distribution hole setting parameters have certain influence on the COD removal rate, but the influence is relatively small. The wastewater treatment effect of the water distribution hole setting parameters of the annular water distribution pipe in Embodiment 1 is better.

3) Research on the Influence of Configuration Parameters of the Catalyst Packing on the COD Removal Rate The test sample wastewater of the same tunnage was removed respectively by means of Embodiment 1, Embodiment 5 and Embodiment 6, and the COD removal rate of the wastewater was calculated, specifically as shown in Table 3 below:

TABLE 3

COD removal rates of Embodiments 1, 5 and 6

| Group | COD removed amount (mg/L) | COD removal rate (%) |
|---|---|---|
| Embodiment 1 | 79875 | 93.97 |
| Embodiment 5 | 77365 | 91.02 |
| Embodiment 6 | 77100 | 90.70 |

Conclusion: It can be seen from the data of Table 3 that different configuration parameters of the catalyst packing have certain influence on the COD removal rate. The wastewater treatment effect of the configuration parameters of the catalyst packing in Embodiment 1 is better.

4) Exploration of the Influence of Different Packing Supports on the COD Removal Rate The test sample wastewater of the same tunnage was removed respectively by means of Embodiment 1 and Embodiment 6. The COD removal rate of the wastewater was calculated, and the energy consumption for wastewater treatment was roughly estimated, specifically as shown in Table 4 below:

TABLE 4

COD removal rates and energy consumption levels of Embodiment 1 and Embodiment 6

| Group | COD removed amount (mg/L) | COD removal rate (%) | Energy consumption level |
|---|---|---|---|
| Embodiment 1 | 79875 | 93.97 | Level I |
| Embodiment 6 | 82875 | 97.50 | Level III |

Note:
The energy consumption level includes, from low to high, Level I, Level II, Level III, Level IV, and Level V. The energy consumption of Embodiment 1 is used as the lowest level (Level 1), and the energy consumption of the comparative example is used as the highest level (Level V). The level range is equally divided into Level 1, Level II, Level III, Level IV, and Level V.

Conclusion: It can be known from the data of Table 4 that different packing supports have certain influence on the COD removal rates, but since the driving motor is added in Embodiment 6, the energy consumption is increased; however, the COD removal rate is improved by means of the function of the circulating packing support. Although the removal rate of Embodiment 1 is slightly less than that of Embodiment 6, the energy consumption is lower. Although the removal rate of Embodiment 6 is slightly greater than that of Embodiment 1, the energy consumption is relatively high. Therefore, corresponding selection can be made according to a demand in actual use.

5) Exploration of the Influence of Different Transmission Components on the COD Removal Rate The test sample wastewater of the same tunnage was removed respectively by means of Embodiment 6 and Embodiment 7. The COD removal rate of the wastewater was calculated, and the energy consumption for wastewater treatment was roughly estimated, specifically as shown in Table 5 below:

TABLE 5

COD removal rates and energy consumption levels of Embodiment 6 and Embodiment 7

| Group | COD removed amount (mg/L) | COD removal rate (%) | Energy consumption level |
|---|---|---|---|
| Embodiment 6 | 82875 | 97.50 | Level III |
| Embodiment 7 | 83580 | 98.33 | Level II |

Note:
The energy consumption level includes, from low to high, Level I, Level II, Level III, Level IV, and Level V. The energy consumption of Embodiment 1 is used as the lowest level (Level 1), and the energy consumption of the comparative example is used as the highest level (Level V). The level range is equally divided into Level 1, Level II, Level III, Level IV, and Level V.

Conclusion: It can be seen from the data of Table 5 that different packing supports are adopted, and there are certain differences in their COD removal rates and energy consumption. Since the water distribution disk is used to drive the circulating packing support, the power consumption of the high-pressure feed pump is correspondingly increased, but relative to the power consumption caused by the use of the driving motor for driving, the power consumption is greatly reduced. Therefore, the energy consumption of Embodiment 7 is slightly greater than that of Embodiment 1 and less than that of Embodiment 6, but the COD removal rate of Embodiment 7 is greater than that of Embodiment 1 and that of Embodiment 6, so that with reference to the comprehensive use effect and energy consumption, the treatment performance of Embodiment 7 is higher.

What is claimed is:

1. A device for treating high-concentration organic wastewater by catalytic hydrothermal gasification, comprising:
   a CHG reactor (1) for the treatment of the high-concentration organic wastewater reaction, comprising: a shell (11), a thermocouple (12), a water distribution device and a packing support, wherein a material inlet (13) and a gas outlet (14) are respectively formed in the shell (11); the packing support is used for placing a catalyst packing, and is arranged at the inner lower part of the shell (11); the water distribution device is arranged in the shell (11) above the catalyst packing; the thermocouple (12) is slantways inserted to a side wall of the shell (11), and extends into the catalyst packing;
   a temporary wastewater storage tank (2) for temporarily storing the heating feed liquid, wherein a liquid inlet (21) of the temporary wastewater storage tank is connected to a condensed liquid outlet (31) of a condensing heat exchanger (3) by means of a high-pressure feed pump and a pipeline, and a liquid outlet (22) of the temporary wastewater storage tank (2) is connected to a material inlet (13) by means of the high-pressure feed pump and a pipeline;
   the condensing heat exchanger (3) for heating feed liquid, wherein a condensed gas inlet (32) of the condensing heat exchanger is connected to the gas outlet (14) by means of a back pressure valve and a pipeline.

2. The device according to claim 1, wherein a check valve and a feed valve are also arranged on the pipeline between the temporary wastewater storage tank (2) and the CHG reactor (1); and pipelines among the CHG reactor (1), the condensing heat exchangers (3) and the temporary wastewater storage tank (2) all adopt tubular products having a thermal insulation function.

3. The device according to claim 1, wherein the packing support is specifically a glass fiber-reinforced plastic packing support (5); the water distribution device is specifically an annular water distribution pipeline (4); and two rows of water distribution holes (41) are formed in the annular water distribution pipeline (4), and all the water distribution holes (41) are in crossed arrangement; each water distribution hole (41) has an aperture of 6 to 10 mm, and a clearance between the water distribution holes (41) is 100 to 150 mm.

4. The device according to claim 1, wherein the packing support is specifically a circulating packing support (6); the circulating packing support (6) comprises:

a plurality of groups of packing net plates (61) for placing the catalyst packing, which are arranged in the shell (11) at equal intervals and are specifically divided into: a top-layer packing net plate (611) having a conical section, an intermediate-layer packing net plate (612) having inverted conical sections, and a bottom-layer packing net plate (613) having an inverted conical sections; circumferential outer edges of all the groups of packing net plates (61) are detachably connected to the inner wall of the shell (11);

the center of each of the top-layer packing net plate (611) and the intermediate-layer packing net plates (612) is provided with a through hole (614) sleeved on a packing conveying column (62); annular clamping slots (615) used for being matched and abutted with clamping rings (64) nested on the packing conveying column (62) are arranged at the through holes (614); the center of the bottom-layer packing net plate (613) is provided with one embedding slot (616) for abutting to enable the packing conveying column (62) to be in limited rotation;

the packing conveying column (62) for upwards conveying the catalyst packing, wherein the packing conveying column comprises an internally hollow column body (621) and a center rotating rod (622) arranged at the axis in the column body (621); a plurality of material holes (623) are circumferentially formed in the side wall of the upper part at positions, corresponding to all the packing net plates (61), of the column body (621); an upper top surface of the column body (621) is also provided with a rotating block (65) which is connected to a transmission component (7) for transmission; the rotating block (65) is fixedly connected to the upper end of the center rotating rod (622), and the center rotating rod (622) is also provided with a helical blade (624) used for lifting the catalyst packing;

a packing guide pipe (63) for downwards conveying the catalyst packing, wherein branch ports (631) detachably connected to all material guide connection ports (15) are formed in the packing guide pipe; all the material guide connection ports (15) are sequentially arranged on the outer wall of the shell (11) at the upper part corresponding to the positions of the corresponding packing net plates (61); and the upper top surface and the lower bottom surface of the packing guide pipe (63) are correspondingly provided with a charging hole (632) and a material outlet (633) which are provided with sealing doors.

5. The device according to claim 4, wherein a thermowell hole (617) used for allowing the thermocouple (12) to be inserted and pass through is also formed in the intermediate-layer packing net plate (612), and a plurality of mesh baffles (625) are arranged on the helical blade (624) of the packing conveying column (62) at equal intervals.

6. The device according to claim 4, wherein the transmission component (7) is a driving motor (71), and the driving motor (71) is arranged on the upper top surface of the shell (11) of the CHG reactor (1), and is connected to the rotating block (65) for transmission by means of an output shaft of the driving motor (71).

7. The device according to claim 4, wherein the transmission component (7) is composed of a water distribution device and a rotating rod (73); the water distribution device comprises an internally hollow water distribution disk (72); and the water distribution disk (72) is composed of a center disk structure (721) and a water distribution ring structure (722) located at a circumferential outer edge of the center disk structure (721);

the rotating rod (73) is arranged at the center of the lower bottom surface of the center disk structure (721) and is connected to the rotating block (65), and a rotating wheel (74) is arranged in the water distribution disk (72) and is connected to the rotating rod (73); a plurality of rotating vanes (741) matched with the size of a circular section of the water distribution ring structure (722) are circumferentially arranged at the circumference of the rotating wheel (74); and retaining rings (742) used for retaining and limiting flow are arranged on the rotating wheel (74) behind the rotating vanes (741);

staggered water outlet holes (75) are formed in the lower bottom surface of the water distribution ring structure (722); a plurality of groups of several water outlet rotating heads (76) are annularly distributed on the lower bottom surface of the center disk structure (721); the water outlet rotating heads (76) comprise rotating pipes (761) connected to the lower bottom surface of the center disk structure (721) by means of shaft sleeves; the upper ends of the rotating pipes (761) are provided with rotating gears (762); the lower ends of the rotating pipes (761) are provided with water outlet heads (763); one transmission toothed ring (743) is arranged at a position, corresponding to the position of each water outlet rotating head of the water outlet rotating heads (76) of each circle, on the rotating wheel (74) and is in meshing transmission with the rotating gear (762) of the each water outlet rotating head of the water outlet rotating heads (76).

\* \* \* \* \*